Oct. 9, 1951 G. A. HAWKINS 2,570,945
DRILL BIT HAVING FILE TEETH
Filed Feb. 27, 1946
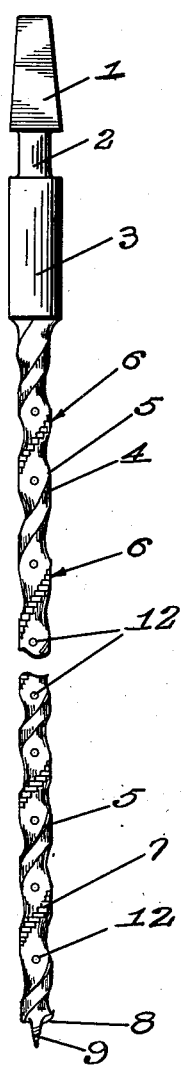
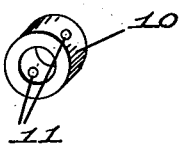
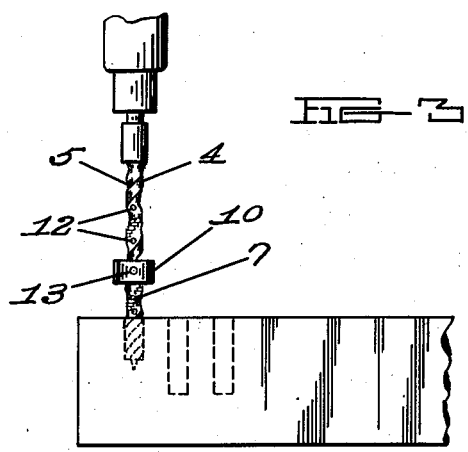
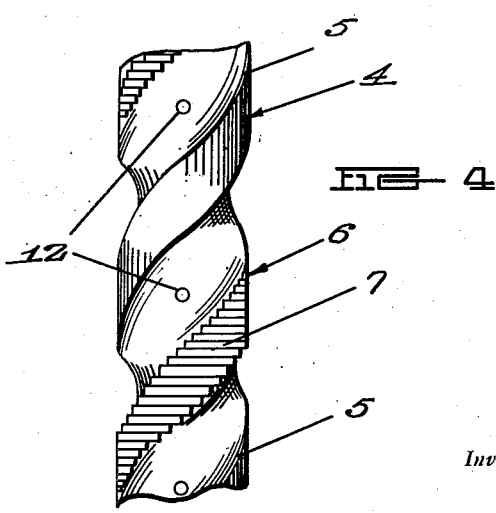
Inventor
GENERAL ARTHUR HAWKINS
By Clarence A. O'Brien
and Harvey B. Jacobson
Attorneys Patented Oct. 9, 1951

2,570,945

UNITED STATES PATENT OFFICE 2,570,945

DRILL BIT HAVING FILE TEETH

General Arthur Hawkins, Dallas, Tex.

Application February 27, 1946, Serial No. 650,453

1 Claim. (Cl. 7—14.1)

This invention relates to improvements in bits or drills.

An object of the invention is to provide an improved bit or drill, which will be formed with an alternately arranged spiral beveled straight-edged cutting blade and a spiral toothed cutting blade.

Another object of the invention is to provide an improved bit or drill with means for gauging the depth of a hole to be drilled.

A further object of the invention is to provide an improved form of bit or drill having a screw and cutter at its forward end and a shank engageable by a machine or hand brace, together with alternately arranged saw teeth formed spirally throughout the length of the bit, and with an alternate spiral arranged chisel cutting edge.

A still further object of the invention is to provide an improved bit or drill which will be highly efficient in use and relatively inexpensive to manufacture and produce.

Other objects will appear as the description proceeds.

In the accompanying drawings which form a part of this application:

Figure 1 is a side elevation of the improved bit or drill;

Figure 2 is a perspective view of the depth gauge attachment or ring used in connection with the bit or drill;

Figure 3 is a side elevation showing the bit or drill with depth gauge ring in position thereon for drilling a series of similar depth openings, and Figure 4 is an enlarged side elevation of a section of the improved bit or drill.

Like characters of reference are used throughout the following specification and the accompanying drawings to designate corresponding parts.

In carrying out the invention, there is provided an improved form of bit or drill including a tapered brace or chuck engaging shank 1, the adjacent portion of said bit or drill being formed with an annular groove 2, and an adjacent cylindrical head portion 3.

The head portion 3 is shaped or twisted to form the fluted bit or drill webs generally designated by the reference numeral 4.

The web or fluted portions of the bit or drill are formed with the alternately arranged spiral bevelled cutting blade 5 formed on the upper edge of one spiral web and with a saw toothed spiral cutting blade 6 having its edge formed with elongated transversely arranged right angular stepped teeth on the outer surface of another spiral web.

The lower ends of the spiral blades or webs 5 and 6 terminate in the oppositely disposed cutting bits 8, and an axially aligned tapered screw 9.

A depth gauge ferrule or ring 10 is formed with transversely extending aligned apertures 11, and is adapted to fit over the cutting webs of said bit or drill, and to cooperate with the spaced apertures 12 formed through the fluted portion of said bit or drill.

A transversely extending locking pin 13 is positioned or placed through the apertures 11 in the ring 10 and through one of the apertures 12 through the bit or drill to support the depth gauge ring in the desired adjusted position.

The drill or bit will be rotated until the required depth of hole is bored, at which time the bit will be reciprocated by the operator in the hole while the bit is still being rotated, thereby cutting the hole clean of chips, etc.

It will be understood that the improved bit or drill may be used for many types of work.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

A bit or drill including a supporting shank at one end, oppositely disposed spiral webs disposed in axial alignment therewith and defining a prolongation thereof, a beveled cutting blade formed on the upper edge of one of said webs, elongated transversely extending right angular stepped cutting teeth on the outer surface of the other web, a starting screw formed on the lower edge of said bit or drill, and oppositely disposed cutting bits formed on the lower ends of said spiral webs.

GENERAL ARTHUR HAWKINS.

REFERENCES CITED

The following references are of record in the file of this patent:

UNITED STATES PATENTS

| Number | Name | Date |
|---|---|---|
| 62,849 | Hofstatter, Jr. | Mar. 12, 1867 |
| 597,750 | Smith | Jan. 25, 1898 |
| 1,387,234 | Burke | Aug. 9, 1921 |
| 2,035,298 | Caldwell | Mar. 24, 1936 |
| 2,101,583 | Honneknovel | Dec. 7, 1937 |
| 2,344,143 | Harding | Mar. 14, 1944 |